Figure 1:
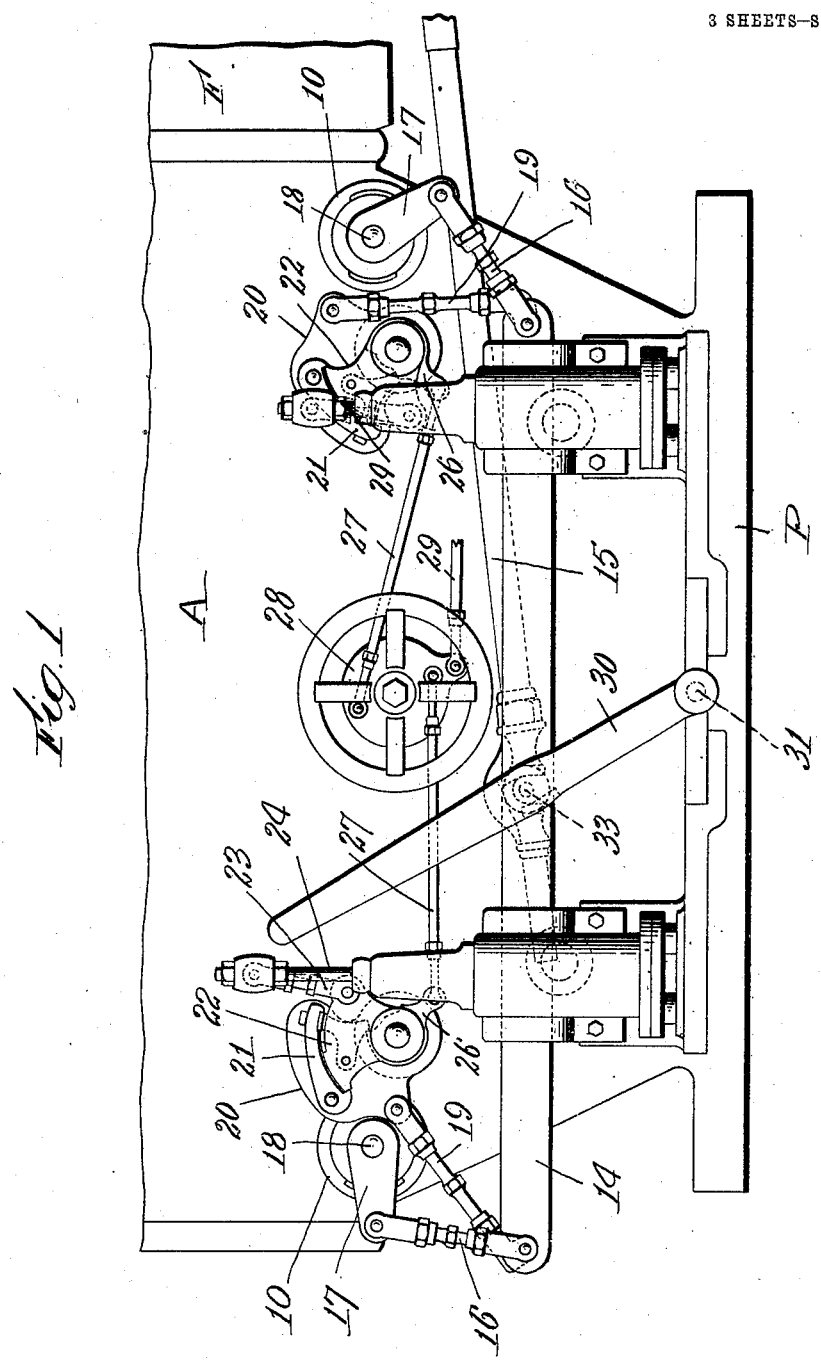

C. D. PARKER.
VALVE GEAR FOR ENGINES.
APPLICATION FILED AUG. 1, 1904.

983,564.

Patented Feb. 7, 1911.
3 SHEETS—SHEET 1.

Witnesses:
C. F. Neeson.
M. E. Regan.

Inventor:
C. D. Parker,
By his Attorneys,
Southgate & Southgate

C. D. PARKER.
VALVE GEAR FOR ENGINES.
APPLICATION FILED AUG. 1, 1904.
983,564.
Patented Feb. 7, 1911.
3 SHEETS—SHEET 2.
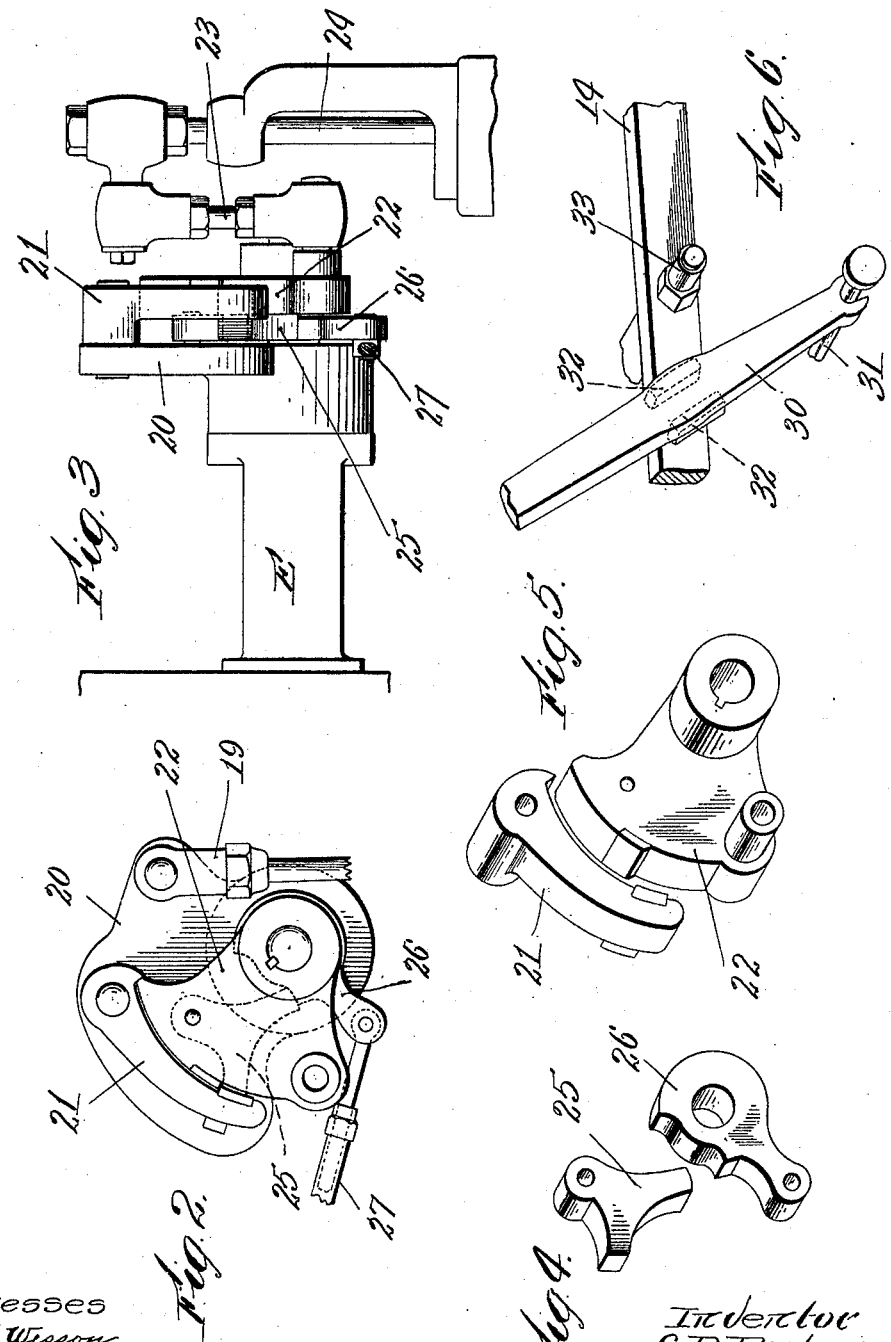

C. D. PARKER.
VALVE GEAR FOR ENGINES.
APPLICATION FILED AUG. 1, 1904.
983,564.
Patented Feb. 7, 1911.
3 SHEETS—SHEET 3.
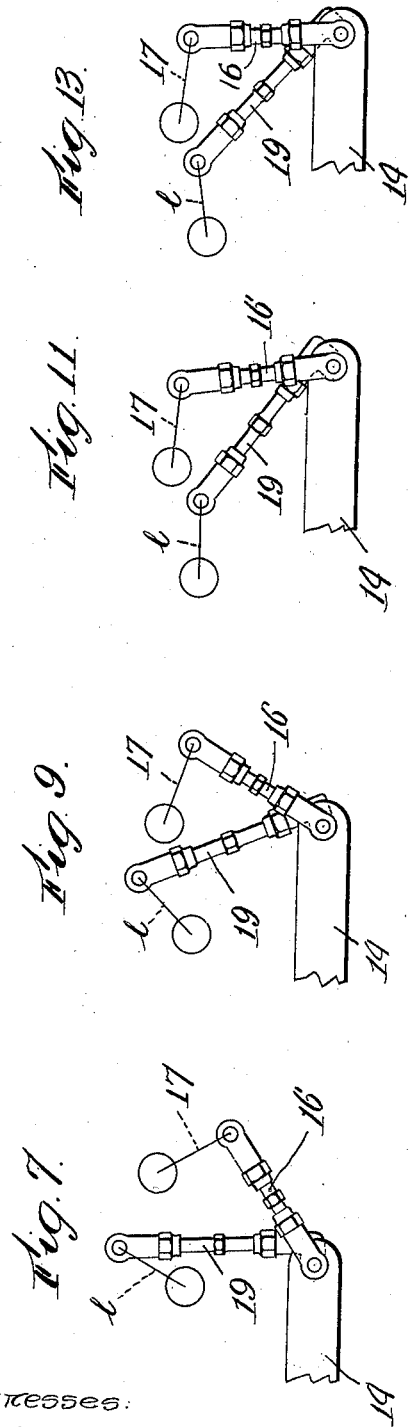
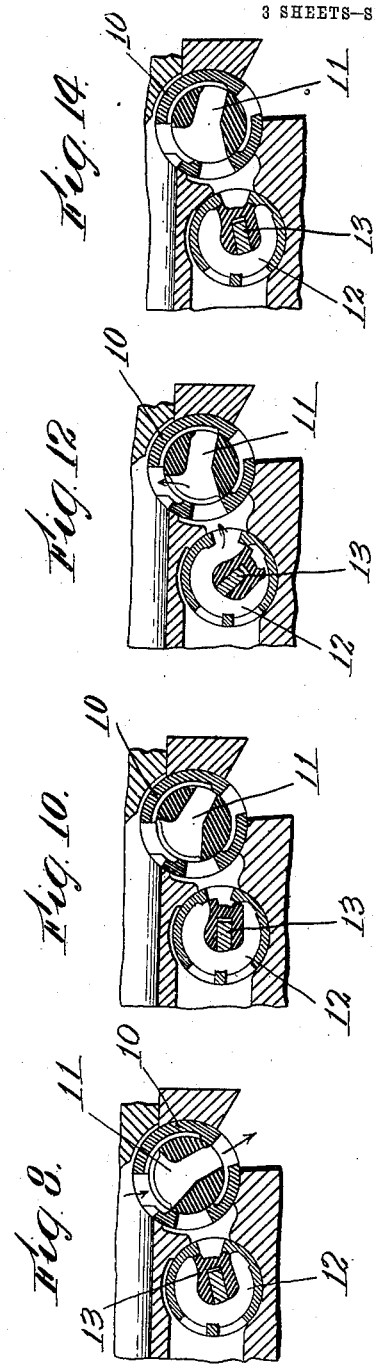
Witnesses:
C. F. Nisson
M. E. Regan
Inventor:
C. D. Parker
By his Attorneys,
Southgate and Southgate

UNITED STATES PATENT OFFICE.

CHARLES D. PARKER, OF WORCESTER, MASSACHUSETTS.

VALVE-GEAR FOR ENGINES.

983,564.  Specification of Letters Patent.  Patented Feb. 7, 1911.

Application filed August 1, 1904. Serial No. 218,956.

*To all whom it may concern:*

Be it known that I, CHARLES D. PARKER, a citizen of the United States, residing at Worcester, in the county of Worcester and State of Massachusetts, have invented a new and useful Valve-Gear for Engines, of which the following is a specification.-

This invention relates to an arrangement of engine valves and of connections for operating the valves.

The especial objects of this invention are to provide simple and efficient connections for operating the inlet and exhaust valves of a steam engine in such a way that the valves will have quick opening and closing movements and dwells or slow movements while in their open or closed positions; to provide for maintaining two valve-closed passages between the steam-chest and exhaust during most of the time of operation; and to combine the steam and exhaust valves so that an engine will have very small clearance or dead spaces.

In the accompanying three sheets of drawings, Figure 1 is a side view of sufficient parts of a steam engine to illustrate the application of my invention thereto. Fig. 2 is a detail view of the connections for operating one of the inlet valves. Fig. 3 is a side view of the parts shown in Fig. 2. Figs. 4 and 5 are perspective views of the parts shown in Fig. 2. Fig. 6 is a detail view showing a form of operating bar which may be used when it is desired to operate the valves by hand. Fig. 7 is a detail view showing the position of the links when the engine cylinder is exhausting. Fig. 8 is a sectional view showing the position of the valves corresponding to the position of parts shown in Fig. 7. Fig. 9 is a detail view showing the position of the links when the exhaust valve has closed. Fig. 10 is a sectional view showing the valves in position corresponding to Fig. 9. Fig. 11 is a detail view showing the position of the links while the steam valve is opened. Fig. 12 is a sectional view showing the valves in position corresponding to Fig. 11. Fig. 13 is a detail view showing the parts in the position when the cut-off works to close the inlet valve, and Fig. 14 is a sectional view showing the valves in position corresponding to Fig. 13.

In the economical operation of steam engines it is essential that both the inlet and the exhaust valves should open and close promptly, and that these valves should be given the proper amount of dwell in their opened or closed positions. That is to say, a prompt operation of the valves of a steam engine is necessary in order to avoid the wire-drawing or throttling of the steam passages which materially reduces the efficiency of an engine.

A valve gear constructed according to this invention has been especially designed to secure a prompt and reliable operation of the valves by means of connections operated from a longitudinally movable slide or bar, the valves being operated by links which are so connected to crank-arms that a crank-arm and its link will be substantially on dead center when a dwell of a valve is desired, and each link will stand at a considerable angle to its crank-arm when imparting the desired quick opening or closing movements.

Referring to the drawings and in detail, A designates a cylinder casting which is supported on a foundation-plate P. Extending from one end of the cylinder casting A is an engine frame F. These parts may be of the usual or ordinary construction and need not be completely illustrated herein.

Fitted transversely into the cylinder casting near each end thereof is a casing 10, each containing an outlet valve 11, as shown most clearly in Figs. 8, 10, 12 and 14; while also fitted transversely into the engine casting near each end thereof is a valve casing 12 containing a steam valve 13. The connections for operating each set of valves 11 and 13 at each end of the cylinder are most clearly illustrated in Fig. 1. These connections comprise an actuated slide or bar 14 which is moved longitudinally by a hook-rod 15 which forms a connection from the slide 14 to be operated by an eccentric on the main shaft of the engine in the ordinary manner.

At each end the sliding bar 14 is connected by a link 16 to a crank arm 17 secured upon the valve-stem 18 of an exhaust valve, and at each end also the slide 14 is connected by a link 19 to a rock-plate 20 which is journaled upon an extension E extending out from an inlet valve casing as shown in Fig. 3. Pivotally mounted on the rock-plate 20 is a latch 21 having a steel contact strip engaging a steel contact strip of a rock-plate 22 secured upon the stem of the inlet valve. The latch 21 may move down into engagement by gravity, or may be pressed down by a spring, if desired. Connected to the rock-plate 22 is a link 23 which is connected at its upper end to a dash-pot rod 24. These dash-pots may be of the ordinary or usual construction, and need not be herein described at length. In the use of these connections for operating an inlet valve it will be seen that the latch 21 serves to open the inlet valve, and the dash-pot connections serve to close the inlet valve.

Connections for releasing the latch so as to secure a variable closing or cut-off of the steam valve are most clearly illustrated in Fig. 4. As shown in this figure, 25 designates a throw-off bell-crank lever which is pivoted to the rock-plate 22. One arm of the throw-off lever 25 is adapted to engage the latch 21, while the other arm of the throw-off lever 25 engages a cam or releasing piece 26. The piece 26, as shown in Fig. 1, is connected by a link 27 to a wrist-plate 28, the wrist-plate 28 being shifted or turned by a connection 29 from the governor of the engine in the ordinary manner.

Considering now the relation of the parts by means of which I secure the desired quick opening movements and dwells of the valves, the action of the parts is most clearly illustrated in Figs. 7 to 14 inclusive. When the parts occupy the positions illustrated in Figs. 7 and 8, it will be seen that the link 19 is substantially upon a dead center with respect to the effective crank 1 which tends to turn the rock-plate 20, so that at this time, there will substantially be a dwell or only a slight movement imparted to the inlet valve 13; while on the other hand, the direction of the movement of the link 16 is at a considerable angle to the crank-arm 17 (in practice the crank-arm 17 and link 16 preferably being substantially at right angles at this time) so that a quick closing movement will be imparted to the exhaust valve 11. When the parts occupy the positions illustrated in Figs. 9 and 10 both the inlet and exhaust valves will be closed, but the link 19 will stand at a considerable angle to the effective crank-line 1, and the direction of movement of the link 16 will be substantially around a dead center with respect to the crank-arm 17; and it follows from this that in passing from the positions illustrated in Figs. 9 and 10 to the positions illustrated in Figs. 11 and 12, a quick opening motion will be imparted to the inlet valve, while the outlet valve will substantially dwell or have comparatively little motion imparted thereto. In Figs. 13 and 14 the parts are shown in the same relative positions as in Figs. 11 and 12, except that the inlet valve has been allowed to close by the operation of the automatic cut-off. In a complete valve gear as thus constructed and operated it will be seen that by means of direct link connections from a sliding or reciprocating bar I am enabled to secure the desired motion of the engine valves in a simple and efficient manner.

In the construction illustrated, it will be seen that the steam chest is below the cylinder and that live steam is introduced into the engine cylinder through the casing of the exhaust valve. This invention is especially applicable to this type of engine, because in such engines as heretofore ordinarily constructed, during considerable periods of each operation the steam chest will be separated from the exhaust pipe simply by the main shut-off valve, and if this valve does not fit absolutely tight there will be a direct leakage from the steam chest to the exhaust, this leakage in some cases frequently increasing on account of the erosion and wear due to the leaking steam. In an engine equipped with a valve mechanism according to this invention this difficulty is overcome to a very large measure for the reason that the opening for the live steam through the outlet valve-casing may remain open only a part of the time of one stroke of the engine-piston, the outlet valve turning to close this passage with a motion which is very slow at first, but with a quick final closing action which will interpose the two valves between the steam chest and outlet pipe during a considerably greater period of each cycle of operation than has heretofore been possible with the slow opening outlet valves heretofore used in engines of this type.

Having thus fully described my invention, what I claim as new and desire to secure by Letters Patent of the United States is:

1. In an engine valve gear, the combination of an exhaust valve casing having an inlet port, an exhaust port, and a cylinder port, an oscillating exhaust valve therein, an oscillating steam valve adjacent to the exhaust valve and controlling the inlet port to the exhaust valve casing whereby steam is admitted through said exhaust valve to the cylinder of the engine from said inlet port, a movable member, two links connecting the movable member with the inlet valve and outlet valve, said links being pivoted to the movable member at adjacent points and extending therefrom at a material angle to each other in all positions, whereby a quick opening action is given to the inlet valve and a quick opening and closing action to the outlet valve and double valve-seated openings are maintained the greater part of the time between the steam-chest and the exhaust.

2. In an engine valve gear, the combination of an exhaust valve casing having an inlet port, an exhaust port, and a cylinder port, an oscillating exhaust valve, an oscillating steam valve controlling the inlet port to the exhaust valve casing whereby steam is admitted through said exhaust valve to the cylinder of the engine from said inlet port, a sliding bar or plate, a crank-arm and link connection between each of said valves and the sliding bar, the line of motion of one of said links being at a substantial angle to its crank-arm, while the line of motion of the other of said links is substantially on dead center, and a trip mechanism for the steam valve, whereby quick opening and variable cut-off action will be secured for the steam-valve, and quick opening and closing action for the exhaust valve, whereby during most of the time of operation two valve-closed-passages will be maintained between the steam chest and exhaust.

3. In a valve gear, the combination of an oscillating inlet valve, an oscillating exhaust valve having ports for admitting steam therethrough to the cylinder from the inlet valve, crank-arms for said valves, a movable bar, and links pivotally connecting said crank-arms with the bar at adjacent points and at a substantial angle to each other.

In testimony whereof I have hereunto set my hand, in the presence of two subscribing witnesses.

CHAS. D. PARKER.

Witnesses:
   Louis W. Southgate,
   Philip W. Southgate.